United States Patent [19]

Brunetti et al.

[11] Patent Number: 4,946,636

[45] Date of Patent: Aug. 7, 1990

[54] PROCESS FOR PRODUCING AGGLOMERATED CERAMIC GLAZES

[75] Inventors: Palmiro Brunetti, Lucia; Luigi Capitanio, Capriate; Henning M. Salge, Sassuolo; Felix Schlegel, Spezzano di Fiorano, all of Italy

[73] Assignee: Bayer Aktiengesellschaft, Leverkusen, Fed. Rep. of Germany

[21] Appl. No.: 344,309

[22] Filed: Apr. 27, 1989

[30] Foreign Application Priority Data

May 2, 1988 [IT] Italy .................. 20417 A/88

[51] Int. Cl.$^5$ .............................. B29C 47/00
[52] U.S. Cl. .................. 264/141; 264/211.11; 501/14; 501/17; 501/20
[58] Field of Search ............ 264/141, 143, 211.11; 428/426; 501/14, 15, 17, 20

[56] References Cited

U.S. PATENT DOCUMENTS

| | | | |
|---|---|---|---|
| 3,871,890 | 3/1975 | Eppler et al. | 501/20 |
| 3,898,091 | 8/1975 | Stout | 501/20 |
| 4,273,822 | 6/1981 | Bube | 501/17 X |
| 4,399,089 | 8/1983 | Mohri et al. | 264/57 |

FOREIGN PATENT DOCUMENTS

| | | | |
|---|---|---|---|
| 1471433 | 9/1969 | Fed. Rep. of Germany | 264/211.11 |
| 61-17464 | 1/1986 | Japan | 264/211.11 |

*Primary Examiner*—Jeffery Thurlow
*Assistant Examiner*—Leo B. Tentoni

[57] ABSTRACT

A glaze coating on manufactured article substrates can be provided by agglomerated ceramic glazes obtained by mixing dry or wet glaze with a hardening binder until a paste-like mass is obtained, extruding the paste-like mass, cutting the extruded product into pieces, subjecting the cut pieces to a rapid surface-drying process and then heating the dried pieces to 100°–120° C. until the binder hardens.

7 Claims, No Drawings

PROCESS FOR PRODUCING AGGLOMERATED CERAMIC GLAZES

The present invention relates to a novel process for producing agglomerated ceramic glazes by means of extrusion.

More particularly the present invention relates to a process for producing, by means of extrusion, agglomerated ceramic glazes which are able to provide high production yields, high quality, a variety of shapes and dimensions of the agglomerates and minimum waste during glazing, whereby the water consumption and the amount of sludge can be reduced considerably, with consequent savings in energy and reduction of costs.

BACKGROUND OF THE INVENTION

As is known to persons skilled in the art, a ceramic object is normally formed by a body consisting of clay material and by a vitreous surface coating specially formulated to provide the object itself, after suitable firing at a high temperature, with improved physical and aesthetic characteristics.

It is also known that the vitreous coating is obtained by applying ceramic glazes consisting of finely ground mixtures of the following components: (a) frit consisting of borosilicate glass of varying composition which, during firing of the ceramic object, fuses and forms a compact layer; (b) pigments, consisting of inorganic substances with coloring power, which are stable at the temperature at which the ceramic object is fired and are enclosed by the vitreous layer to which they impart the desired chromatic characteristics; (c) suspending agents, that are clays, kaolins and other substances necessary for obtaining, in wet glazes, rheological characteristics suitable for the application; finally, it may be necessary to use other specific inorganic substances in order to obtain special effects in the glaze, such as opacification, special surface features, etc.

In the case of wet glazing, the ceramic glazes are normally ground in HALSING mills, to which water is added, thereby producing a liquid suspension or glaze slurry which can be applied to the ceramic object using various methods, among which the following are mentioned: (1) spraying: with this method the glaze is atomized by means of nozzles and compressed air or a pressure pump, the jet being directed onto the surface to be coated; (2) dipping: with this method the object to be coated is dipped into the glaze slurry, thereby ensuring that its entire surface is glazed; (3) bell-chamber method: in this case, the glaze slurry is made to flow continuously over a bell-formed body, in the form of a vertical film, while the object to be coated moves horizontally below it. This system is suitable only for coating flat surfaces; (4) orifice method: this is a method similar to the preceding one, but the film of glaze is obtained by means of a hopper with an adjustable horizontal slit; (5) disk method: according to this method, a system of rotating disks is used, which produces a "shower" of glaze. This method is suitable for the formation of non-uniform layers and is used, in particular, for glazes with a low water content.

Industrially, for mass production, use is made of continuous-application machines which recover and recycle the excess glaze not retained by the object to be glazed.

As mentioned above, wet glazing has various drawbacks which, according to their nature, can be divided into three categories: (a) qualitative, (b) energy-related and (c) ecological. As regard the first type of drawback, it should be noted that, during application, the rheological characteristics of the circulating ceramic slurry tend to vary, especially owing to water evaporation, thereby requiring constant monitoring and restoration of the optimum conditions.

With respect to the second type of drawback, before firing in the kiln, the object glazed with wet glaze must be dried, thus resulting in thermal energy being applied (i.e. the consumption of energy). In addition, the glaze application and/or purification of the waste and sludge, which will be described below, require further consumption of energy.

As regards, finally, the third type of drawback, it should be noted that, when changing the product, it is often necessary to water-wash the mill, the conveying and storage equipment, as well as the glazing machines. Quantities of glaze ranging from 1% to 10% are thus lost, depending on the duration of the production compaign. Furthermore, these washing operations give rise to liquid effluents which must be purified before being discharged. Typical pollutants are heavy metals and boron, the removal of which, especially in the case of the latter, is particularly costly.

Purification of water and waste gives rise to the problem of sludge which, due to the presence of heavy metals, is normally classified as harmful toxic waste. Where recycling to production is not possible, which is in any case difficult to implement the said sludge must be disposed of a required by law.

In order to overcome the drawbacks of wet glazes, attempts have been made to apply dry glazes in powder form, using various methods, but these have also produced unsatisfactory results, in particular owing to the lack of uniformity of the layer applied, inadequate adhesion to the ceramic object and environmental problems due to the volatility of the powder.

For some years, however, there has been an increasing trend towards products in the form of granules, pellets and flakes, suitable for continuous glazing processes on flat and horizontal surfaces. Application is effected by means of feeder machines. These machines normally consist of: a hopper for charging the material, the bottom of which is provided with an adjustable slit; (2) a feeding system consisting of a vibrating sieve with a wide-mesh screen or of two or more rotating rollers. Both the sieve and the rollers have the function of distributing uniformly the glaze on the (flat) objects to be coated, which pass directly underneath; (3) a system for recovering and recycling the glaze not used: this system consists of a collection hopper and a bucket elevator, which brings the recovered glaze back to the charging hopper; (4) if necessary, a dust extractor with a dust-removal filter, for preventing the dust from escaping.

As is known, pelletized glazes are obtained from conventional ground glazes. Through the addition of binders, granulation in a special mixer and drying, spheroidal pellets of a certain consistency are obtained. Usually screening is required in order to ensure a constant granulometric range.

Again using conventional glazes, it is possible to prepare sintered coarse agglomerates in which cohesion between the particles is developed by keeping the product for a certain period at temperatures close to the softening range. These sintered product must then be reduced into granules of the required dimensions by means of grinding and granulometric grading.

Frit granules, however, are obtained by means of roller milling and grading into the required granulometric ranges. It is also possible for them to be colored using inorganic pigments.

Finally, there are laminated frits which are made from frit flakes by milling and screening.

While not possessing the negative features of wet glazes and dry glazes in powder form, granulated enamels have other disadvantages peculiar to them.

All the granulated products are supplied ready for use and applied directly. Any contamination and lack of homogeneity, resulting from production plants and cycles which are sometimes complex, are not subject to the dispersive action of the mill, as in the case of wet glazes; there is consequently more reject of the ceramic product.

As already mentioned above existing granulated products require screening or grading during production. This result in the formation of rejects or various granulometric fractions, thereby increasing the cost of recycling during production, if they are not sold in proportionate quantities.

Furthermore, the preparation of pelletised glazes involves various operations which are certainly more complex than those required by wet glaze. The final cost of the product is bound to be higher. Finally, it must be remembered that, depending on the type of granules and the production process, the shape of the granules is always the same and that only the average dimensions may vary according to the various granulometric fraction.

Therefore, the object of the present invention is to produce a new type of ceramic glaze which does not have the drawbacks either of wet ceramic glazes or of other types of dry glazes known hitherto.

BRIEF DESCRIPTION OF THE INVENTION

According to the present invention, this object is achieved by mixing a dry or wet ground glaze with a hardening binder of a suitable nature or, in case of using dry ground glazes, to add the binder already before or during milling, thereby producing a paste-like mass with a viscosity and plasticity such that it can be extruded from moulds or dies. Therefore, using cutting equipment and with subsequent drying, it is possible to produce agglomerates of suitable dimensions and adequate hardness for dry glazing using a continuous feeding machine.

DETAILED DESCRIPTION OF THE INVENTION

The present invention relates to a process for producing agglomerated ceramic glazes which process comprises mixing dry or wet milled glaze with a hardening binder until a paste-like mass is obtained, extruding the paste-like mass, cutting the extruded product into pieces, subjecting said cut pieces to a rapid surface-drying process and then heating the dried pieces to 100° to 120° C. until the binder hardens.

According to the present invention, the binders suitable for the production of extruded agglomerates, in addition to possessing the abovementioned characteristics, must be capable of being eliminated through evaporation and/or combustion during firing of the ceramic object, before softening of the enamel, so as not to interfere with vitrification. Furthermore, the products resulting from evaporation or combusting of the said binders must not pose problems affecting the ecological or working environment.

Examples of substances which are useful as binders for the production of extruded agglomerates of ceramic glazes are vegetable starches, such as maize, wheat, rice and potato starch, as well as cellulose derivatives such as, for example, carboxymethylcellulose, hydroxymethylcellulose, ethylcellulose, hydroxypropylcellulose and hydroxybutylcellulose.

According to the process of the present invention, in case of adding the binder to the already ground glaze, both the starches and the cellulose derivatives must be gelatinized. The gelatinized starch is obtained by mixing the said starch dispersed in cold water (10°–30° C.), with hot water (80°–95° C.).

The gelatinization of the cellulose derivatives is effected by means of the reverse process, i.e. by mixing a dispersion in hot water (80°–95° C.), with cold water (10°–30° C.).

Using a gelatinized starch, a suitable composition is obtained by mixing a vegetable starch dispersed in water at 10° to 30° C. with a water: starch percentage ratio of between 40:60 and 70:30 with water at 80° to 95° C., so as to have a water: starch ratio of between 60:40 and 95:5.

When the hardening binder is gelatinized cellulose, the binder is obtained by mixing water at 10° to 30° C. with a cellulose derivative dispersed in water at 80° to 95° C., wherein the initial water: cellulose percentage ratio is between 40:6 and 70:30 and the final ratio is between 80:20 and 98:2.

The initial and final percentages of water vary, according to the viscosity required, within the limits shown below:

TABLE I

|  | Starches (% of water) | Cellulose derivatives (% of water) |
|---|---|---|
| Initial dispersion | 40–70 | 40–70 |
| Final gelatinized product | 60–95 | |

Shown below, in tabular form, are four examples of formulations of mixtures able to provide masses suitable for extrusion; the numbers shown in the 4 columns indicate the parts by weight of the various components:

TABLE II

|  | 1 | 2 | 3 | 4 |
|---|---|---|---|---|
| Glaze slurry (40% H$_2$O) | 100 | 100 | — | — |
| Glaze in powder form | — | — | 100 | 100 |
| Gelatinized starch | 10–70 | — | 20–110 | — |
| Gelatinized cellulose | — | 20–50 | — | 30–80 |

According to the process of the present invention, the glaze mixtures for extrusion can be prepared by mixing the various components in a continuous or discontinuous manner. In the first case, planetary mixers with a rotating basin or the like may be used. In the second case, use is made of continuous screw or blade mixers consisting of one or two stages, with continuous feeding of the ingredients. Whatever the mixing process or the equipment used it is essential that the final mixture should be perfectly homogeneous.

Once mixing has been completed, the paste-like mass is introduced into the extruder consisting of a high-pressure screw and a horizontal extrusion head, and the extruded product is allowed to drop vertically. The extrusion head has mounted on it a cutter with one or more rotating blades, so that it is possible to obtain pieces, the length of which can be varied, as required, by suitably adjusting the speed of rotation of the blades.

Immediately after cutting the agglomerates must be subjected to a rapid surface-drying process so as to prevent them sticking to each other. For this purpose, hot air can be blown into the cutting zone, for example by means of a fan and a blowpipe in the form of a perforated cylinder.

Subsequently, these pieces are heated to 100°–120° C., preferably in continuous belt driers, with vibrating sieves or other systems which allow heating of the agglomerates arranged, preferably, in a single layer or, in any case, in a thin layer. This heating process causes the binder to harden. The agglomerated ceramic glazes obtained by means of extrusion, using the process of the present invention, enable high production yields to be achieved. In fact, practically all the initial glaze can be transformed into agglomerate of the same shape and size, without reject or fractions to be recycled. Furthermore, using this process, it is possible to produce the agglomerates in a vast range of shapes and sizes.

Thus it is possible by mixing agglomerates of different compositions and/or sizes, colored or uncolored, to achieve a greater range of glaze effects by only one glaze application process.

The production process according to the present invention also permits a high degree of homogeneity and reduces the possibility of contamination, thus resulting in improved quality of the glazed product.

The process according to the invention enables the waste resulting from glazing to be reduced to a minimum: in fact, internal equipment for storing and conveying the enamel is no longer necessary. The cleaning operations during the production changes are limited to the feeding machine alone, with the possibility, however, of recovering almost all of the glaze in the cycle.

Moreover, since cleaning of equipment is no longer necessary, the amount of water to be purified and the sludge to be disposed of are drastically reduced.

Since there is much less water to be evaporated during drying, less energy is required for the glazing process.

Finally, due to the relative simplicity of the production process according to the present invention, the high yields and the other advantages offered, dry glazing using the extruded agglomerates of the present invention is possible at an overall cost which is similar to or not much more than that of wet enamelling.

What is claimed is:

1. Process for producing agglomerated ceramic glazes which comprises mixing dry or wet ground glaze with a hardening binder until a paste-like mass is obtained, extruding the paste-like mass, cutting the extruded product into pieces, subjecting said cut pieces to a rapid surface-drying process and then heating the dried pieces to 100°–120° C. until the binder hardens.

2. Process according to claim 1 wherein the hardening binder is a gelatinized starch obtained by mixing a vegetable starch dispersed in water at 10° to 30° C. in a water: starch percentage ratio of between 40:60 and 70:30 with water at 80° to 95° C., so as to have a water: starch ratio of between 60:40 and 95:5.

3. Process according to claim 1 wherein the hardening binder is gelatinized cellulose obtained by mixing water at 10° to 30° C. with a cellulose derivative dispersed in water at 80° to 95° C., wherein the initial water: cellulose percentage ratio is between 40:60 and 70:30 and the final ratio is between 80:20 and 98:2.

4. Process according to claim 1 wherein the paste-like mass ready for extrusion is prepared by mixing from 10 to 70 parts by weight of gelatinized starch with 100 parts by weight of glaze slurry.

5. Process according to claim 1 wherein the paste-like mass ready for extrusion is prepared by mixing from 20 to 50 parts by weight of gelatinized cellulose with 100 parts by weight of glaze slurry.

6. Process according to claim 1, wherein the paste-like mass ready for extrusion is prepared by mixing from 20 to 110 parts by weight of gelatinized starch with 100 parts by weight of glaze in powder form.

7. Process according to claim 1 wherein the paste-like mass ready for extrusion is prepared by mixing from 30 to 80 parts by weight of gelatinized cellulose with 100 parts by weight of glaze in powder form.

* * * * *